Oct. 10, 1933.   T. PETERSEN   1,929,647

DIE STOCK

Filed Dec. 18, 1930

Tharvald Petersen
INVENTOR.

BY
ATTORNEYS.

Patented Oct. 10, 1933

1,929,647

UNITED STATES PATENT OFFICE 1,929,647

DIE STOCK

Thorvald Petersen, Erie, Pa., assignor to Reed Manufacturing Company, Erie, Pa., a corporation of Pennsylvania Application December 18, 1930
Serial No. 503,146

4 Claims. (Cl. 10—127)

The present invention is directed to a die stock which has an adjustable guide formed by radially operating guide bars which guide bars are actuated by an actuating ring. The actuating ring is yieldingly held in position by a nut exerting pressure on the actuating ring. The present invention is directed to improving the manner of securing the nut in adjustment. Features and details of the invention will appear from the specification and claims.

A preferred embodiment of the invention is illustrated in the accompanying drawing as follows:—

Figure 1:
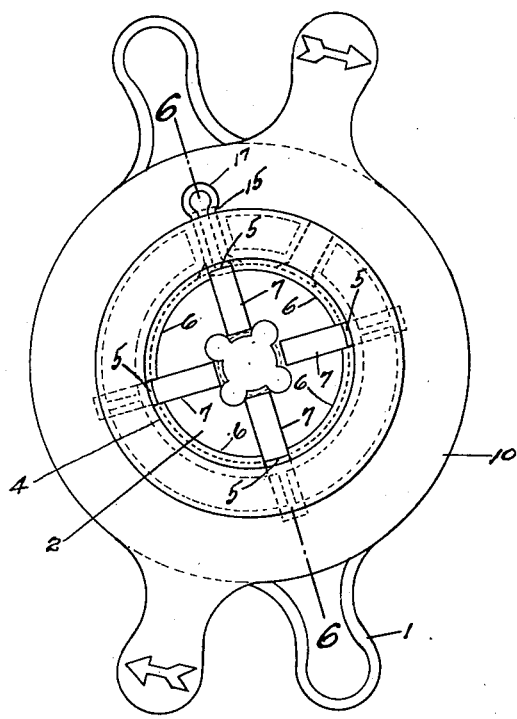
Figure 2:
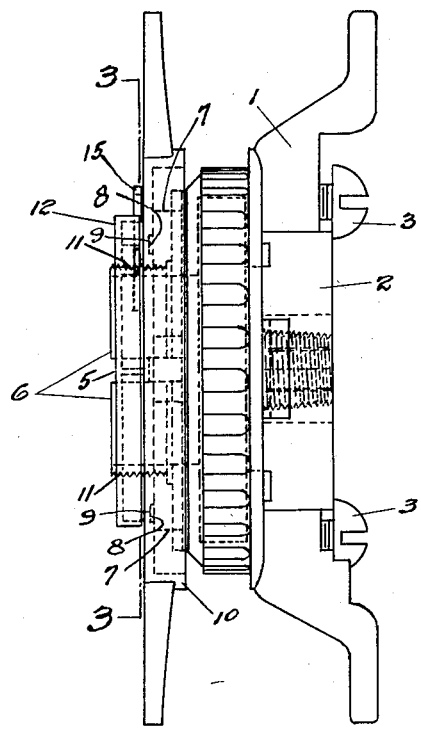
Figure 3:
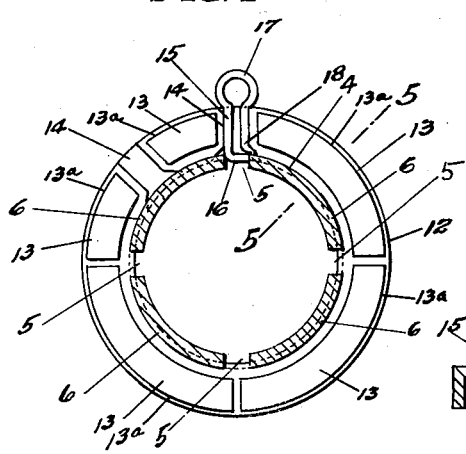
Figures 4, 5:
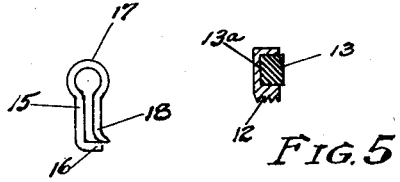
Figure 6:
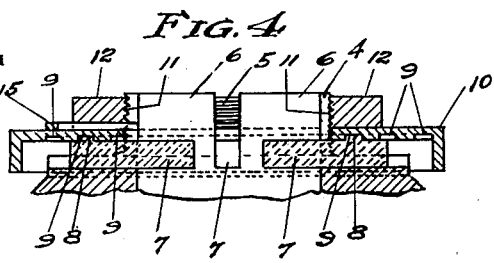

Fig. 1 shows a rear view of the stock.
Fig. 2 a side elevation of the same.
Fig. 3 a section on the line 3—3 in Fig. 2.
Fig. 4 an elevation of the locking key.
Fig. 5 a section of the nut on the line 5—5 in Fig. 3.
Fig. 6 a section on the line 6—6 in Fig. 1.

1 marks the body of the stock. This carries the die 2 which is secured by screws 3 in the usual manner. The die has a guide extension 4 and this is provided with guide bar slots 5, these slots being extended by ribs 6 on the face of the body.

Guide bars 7 are slidingly mounted in the slots 5 between the ribs 6 and are provided with projections 8 which engage the scroll grooves 9 in an actuating ring 10.

The actuating ring is arranged around the extension and the extension is provided with screw threads 11. A nut 12 operates on the extension. It has friction material 13, such as rubber, arranged in sockets 13a so that it will readily lock, or hold the actuating ring in adjustment. The under-side of the nut is provided with key slots, or openings 14. Preferably there are two of these slots and they are staggered with relation to the slots 5 so that one of the openings 14 will be brought into register with the slots 5 with a very slight adjustment of the nut. A spring key 15 of cotter pin form is arranged in one of the openings 14. It has an end 16 which extends into a slot 5. The outer end has a ring, or return bend 17 by means of which the key may be readily removed for adjusting the nut, or for changing it to the other opening. One arm of the key has an out-turned portion 18 which tends to hold the key in the opening.

In the operation of the device, the nut is turned down so as to give the proper locking engagement to the adjusting ring. It is then locked in this position by the key.

What I claim as new is:—

1. In a die stock, the combination of a body having a die-holding head and guide extension, said extension having guide bar slots and a screw thread at its end; radially extending guide bars in said slots; an actuating ring surrounding the extension and actuating through its rotative movement the guide bars; a nut on the screw threads engaging the ring; and a radially extending key mounted in the nut and acting in a guide bar slot locking the nut in adjustment.

2. In a die stock, the combination of a body having a die-holding head and guide extension, said extension having guide bar slots and a screw thread at its end; radially extending guide bars in said slots; an actuating ring surrounding the extension and actuating through its rotative movement the guide bars; a nut on the screw threads engaging the ring, said nut having a radially extending key opening; and a key in the opening extending into a guide slot.

3. In a die stock, the combination of a body having a die-holding head and guide extension, said extension having guide bar slots and a screw thread at its end; radially extending guide bars in said slots; an actuating ring surrounding the extension and actuating through its rotative movement the guide bars; a nut on the screw threads engaging the ring, said nut having a plurality of radially extending key openings staggered with relation to the slots; and a key in one of said openings engaging a slot.

4. In a die stock, the combination of a body having a die-holding head and guide extension, said extension having guide bar slots and a screw thread at its end; radially extending guide bars in said slots; an actuating ring surrounding the extension and actuating through its rotative movement the guide bars; a nut on the screw threads engaging the ring, said nut having a key opening; and a spring key in the opening engaging a guide slot, said key being of cotter pin form with a loop outside the nut and one side of the key having its end extending at right angles and engaging the walls of a guide slot.

THORVALD PETERSEN.